United States Patent [19]
Luzzader

[11] Patent Number: 6,014,076
[45] Date of Patent: *Jan. 11, 2000

[54] APPARATUS AND METHOD FOR ACHIEVING INTRINSIC SAFETY USING CONVENTIONAL SENSORS

[75] Inventor: Wayne Luzzader, N. Logan, Utah

[73] Assignee: Global Tech, Inc., North Logan, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/775,594

[22] Filed: Dec. 31, 1996

[51] Int. Cl.[7] .............................. G08B 19/00; H04B 10/08
[52] U.S. Cl. ......................... 340/521; 340/511; 340/531; 340/555; 340/612; 340/619; 702/57; 250/900; 359/110; 359/143
[58] Field of Search ................................ 340/521, 555, 340/556, 612, 618, 614, 603, 619, 626, 531, 511; 359/110, 143, 109, 144; 250/577, 900; 702/57

[56] References Cited

U.S. PATENT DOCUMENTS

| | | | |
|---|---|---|---|
| 3,713,338 | 1/1973 | Kind | 73/293 |
| 3,766,395 | 10/1973 | Keir | 73/293 |
| 3,864,577 | 2/1975 | Pellett et al. | 73/293 |
| 4,069,838 | 1/1978 | Hansel et al. | 73/293 |
| 4,194,177 | 3/1980 | Adamson | 340/618 |
| 4,342,919 | 8/1982 | Brogardh | 250/577 |
| 4,354,180 | 10/1982 | Harding | 73/293 |
| 4,373,815 | 2/1983 | Bruce | 73/49.2 |
| 4,408,307 | 10/1983 | Harris | 340/870.28 |
| 4,596,049 | 6/1986 | Rizzotti, III | 340/825.72 |
| 4,730,489 | 3/1988 | Hoekstra | 73/304 C |
| 4,745,293 | 5/1988 | Christensen | 250/577 |
| 4,748,846 | 6/1988 | Haynes | 73/290 V |
| 4,752,141 | 6/1988 | Sun et al. | 73/293 |
| 4,809,551 | 3/1989 | Grossiord | 73/327 |
| 4,850,223 | 7/1989 | Carlin et al. | 73/313 |
| 4,880,990 | 11/1989 | Rando | 250/577 |
| 4,954,724 | 9/1990 | Koda et al. | 250/577 |
| 4,963,729 | 10/1990 | Spillman et al. | 250/277 |
| 4,994,682 | 2/1991 | Woodside | 250/577 |
| 4,998,022 | 3/1991 | Tregay | 250/577 |
| 5,072,617 | 12/1991 | Weiss | 73/299 |
| 5,073,720 | 12/1991 | Brown | 250/577 |
| 5,085,499 | 2/1992 | Griffin et al. | 356/311 |
| 5,088,324 | 2/1992 | Nemeth | 73/291 |
| 5,142,909 | 9/1992 | Baughman | 73/304 C |
| 5,164,605 | 11/1992 | Kidwell | 250/277 |
| 5,253,521 | 10/1993 | Abramovich et al. | 73/306 |
| 5,303,586 | 4/1994 | Zhao et al. | 73/293 |

OTHER PUBLICATIONS

American National Standard, UL 913, Intrinsically Safe Apparatus and Associated Apparatus for Use in Class I, II, and III, Division 1, Hazardous (classified) Locations—Jul. 29, 1988.

*Primary Examiner*—Donnie L. Crosland
*Attorney, Agent, or Firm*—Thorpe, North & Western, LLP

[57] ABSTRACT

An apparatus and method for monitoring parameters of combustible liquids within a tank includes a plurality of sensors disposable within the tank for generating signals indicative of parameters of the contents of the tank, a display disposed on the outside of the tank for generating human perceptible signals indicating parameters regarding the contents of the tank, and a nonconductive communications mechanism for conveying signals between the sensors and the display. The sensor generates electrical signals indicative of the parameter(s) measured. The electrical signal is then converted into an optical signal such as pulses of light. The optical signal is conveyed along the electrically nonconductive communications mechanism to the display. The optical signal is then converted back into an electrical signal outside of the tank where it may be processed to produce a human perceptible signal indicative of the parameter(s) measured.

20 Claims, 3 Drawing Sheets

6,014,076

APPARATUS AND METHOD FOR ACHIEVING INTRINSIC SAFETY USING CONVENTIONAL SENSORS

BACKGROUND OF THE INVENTION

1. Field of the Invention

The present invention relates to apparatus and method for achieving intrinsic safety while utilizing conventional sensors for monitoring parameters of combustible liquid within a tank. More particularly, the present invention relates to the use of a novel conversion and transmission arrangement to enable the use of conventional sensors in an intrinsically safe manner while monitoring combustible liquids in a tank.

2. State of the Art

The use of sensors to monitor the level of liquids within a container is well known. For decades those having gasoline tanks and the like have used sensors to determined such factors as the quantity of gasoline in the tank, typically determined by a combination of level readings and temperature readings, as well as presence of water at the bottom of the tank. Traditionally, such measurements have been conducted by conventional pressure, ultrasonic, capacitive or magnetostrictive transducers for the level measurement and temperature transducers; plus a water sensing probe.

The parameters collected were then transmitted over a wire to processing circuitry where the electrical signals were processed and converted into a human readable form. While such a configuration worked well, the wire connecting the transducers and other circuitry on the inside of the tank and the processing circuitry on the outside of the tank provided for electrical conduction along the wire. Because gasoline is highly flammable, there has been substantial concern that the conductive wire will lead to explosions of the fuel when the proper conditions are present.

In light of these concerns, those skilled in the art have attempted to replace the conventional sensor system with one that is less likely to cause an explosion. Thus, for example, U.S. Pat. No. 4,342,919 teaches a fiber optic measuring device. The device includes a light guide which has a core with a higher refractive index that the surrounding sheath. Light received from the light guide is then monitored to determine the level of the fuel within the tank.

Yet another attempt to replace the sensors of the prior art is taught in U.S. Pat. No. 4,745,293. The patent discloses a fiber optic device with a grating which is used to retroreflect light and thereby determine the level of the monitored liquid. Still another fiber-optic based monitoring system is shown in U.S. Pat. No. 4,752,141.

While there has been numerous attempts to utilize fiber optic technology or sensors which are closely related thereto, such mechanisms have generally met with limited success in the market place. The most substantial problem with these sensors are that they are relatively expensive. For some tank owners, the cost is so high they simply cannot afford these devices. Others can afford the cost of such sensors, but have determined that the expense is not justified by the risk.

Because of these concerns, many tank owners simply use the conventional sensor/conductive wire units to determine tank levels and temperature and run the risk of an explosion in the event that the right combination of environmental conditions are present.

Thus, there is a need for a sensor system which is inexpensive and easy to use and which is also "intrinsically safe", thereby obviating the concern regarding explosions. Such a system should preferably use well established technology without raising the problems associated with the respective types of prior art.

SUMMARY OF THE INVENTION

Thus, it is an object of the present invention to provide a sensor system for monitoring fluid levels within a gasoline storage tank and the like.

It is another object of the present invention to enable the use of conventional sensors, while providing a system which achieves intrinsic safety.

It is still another object of the present invention to provide such a system which is relatively inexpensive and easy to use.

The above and other objects of the invention are realized in specific illustrated embodiments of an apparatus and method for achieving intrinsic safety using conventional sensors including a plurality of sensors disposed in a tank containing combustible fluids for generating signals indicative of parameters of the contents of the tank, a display disposed on the outside of the tank for generating human perceptible signals indicative of parameters regarding the contents of the tank, and a nonconductive communications mechanism for conveying signals between the sensors and the display.

In accordance with one aspect of the invention, the sensors disposed within the tank are configured to generate an electric signal indicative of physical parameters of the contents of the tank. The electric signals are then translated into optical signals which represent the physical parameters sensed by the sensors. The optical signals are then conveyed along the communication mechanism to the display outside of the tank. The optical signals are then translated into human perceptible signals indicative of the physical parameters within the tank.

In accordance with another aspect of the invention, the optical signals conveyed by the nonconductive communications mechanism are translated back into electrical signals in the display. The electrical signals are then processed and converted into human perceptible signals.

In accordance with yet another aspect of the present invention, the display also includes a mechanism for generating electrical command signals responsive to input provided thereto. The electrical command signals are translated into optical signals and are conveyed along the nonconductive communications mechanism to the sensor mechanism disposed within the tank. The optical signals are then translated back into electrical command signals which are then used to control the sensors. Typically, such an aspect of the invention will be used when a user desires the ability to take readings at various times without desiring the consumption of power within the sensors when readings are not being taken. Rather than remaining continuously on, the sensors only analyze the contents of the tank when command signals carried by the nonconductive communications mechanism indicates that such information is desired, or provide only periodic readings unless the command signals are received. Thus, two-way communication between the sensors and the display is achieved.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
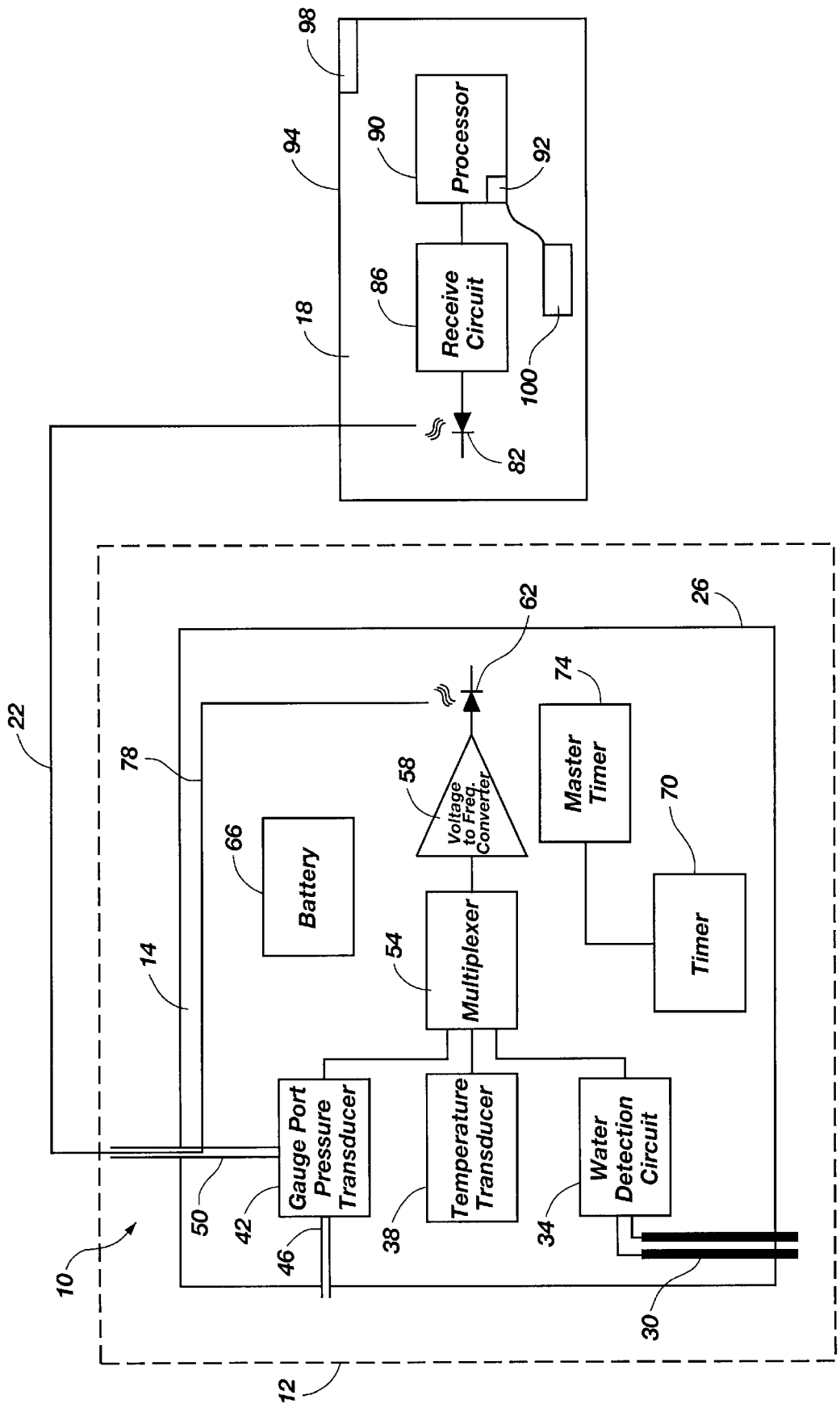
FIG. 1 shows a diagram of a system for monitoring physical parameters within a tank containing flammable materials in accordance with the teachings of the present invention.

Referring to FIG. 1, there is shown a diagram of a monitoring system made in accordance with the principles of the present invention. The monitoring system, generally indicated at 10, includes a sensor portion 14 for monitoring physical parameters within a tank 12, a display portion 18 for displaying indicia of the physical parameters, and an optical signal conduction/communication portion 22 for conveying signals indicative of the physical parameters monitored by the sensor portion to the display portion.

Referring specifically to the sensor portion 14, the sensor portion includes a housing 26 which is configured to isolate signals generated by sensors within the housing from flammable liquids which will typically be disposed about the housing in the tank 12. The housing 26 may be made of numerous materials. However, it is believed that Ultra High Molecular Weight (UHMW) polyethylene is a preferred material.

A pair of water probes 30 which extend from the housing 26 are disposed in communication with a water detection circuit 34. The probes 30 and the water detection circuit 34 are configured for sensing the presence of water on the bottom of the tank 12.

Disposed next to the water detection circuit 34 in FIG. 1 is a temperature transducer 38. The temperature transducer 38 determines the temperature of the liquid surrounding the sensor housing 26 by conduction and radiation from the housing to the transducer mounted inside.

Disposed adjacent the temperature transducer 38 of FIG. 1 is a gauge port pressure transducer 42 which measures the mass of the liquid through a pilot tube 46 which penetrates the housing 26. A second tube 50 references the pressure transducer above the liquid to provide an accurate basis for differential measurement.

The water detection circuit 34, the temperature transducer 38 and the pressure transducer 42 all send signals indicative of the physical parameters which they have monitored to a multiplexer 54. The multiplexer 54 is sequentially switched so that the sensors are connected to a voltage-to-frequency converter 58.

The voltage-to-frequency converter 58 is disposed in communication with and drives a optical signal generating device, such as a light emitting diode 62, at frequencies proportional to the voltage outputs of the water detection circuit 34, the temperature transducers 38, and the gauge port pressure transducers 42.

Power for each of these devices is typically provided by a battery 66 disposed within the housing. The battery continually provides power to timers 70 and a master timer 74, as well as the multiplexer 54. Power to the remaining components is controlled by the master timer 74. This timing occurs periodically and independent of a processor and software disposed in the display portion 18 and discussed in detail below.

After the water detection circuit 34 and the transducers 38 and 42 have generated electrical signals, the signals are directed through the multiplexer 54. The signals are then passed through a first translation/conversion means in the form of a voltage-to-frequency converter 58 and a light emitting diode. Thus the signals are converted from electrical signals into optical signals. From the light emitting diode 62, the optical signals are conveyed over an optical transmission line 78, typically a fiber optic cable, which forms the optical signal conduction/communication portion 22.

The optical transmission line 78 extends from a first end disposed adjacent to the light emitting diode 62, out of the tank 12, and to a second end in communication with a second translation/conversion means, typically an optical sensor means 82 in the form of a photodiode. The optical sensor means 82 senses the optical signals emitted from the light emitting diode 62. Electrical signals generated by the optical sensor means 82 in response to the optical signals are amplified and conditioned by a receive circuit 86. The conditioned signals from the receive circuit 86 are then passed to a processor 90 which includes software for converting the signals into data indicative of liquid levels, volume and temperature sensed by the water detection circuit 34 and the transducers 38 and 42 of the sensor portion 14. The processor 90 typically includes a memory 92 for storing the data so that it may be accessed at a later time.

A display 98 is also contained within a housing 94 of the display portion 18. The display 98 is disposed in communication with the processor 90. The display 98 is configured to display indicia representing the data in human perceptible form. Typically, this will be in the form of an LCD screen or some similar device which enables the user to visualize indicia of the readings obtained by the sensor unit.

A power supply 100 is provided for the display portion 18. The power supply 100 may be a battery, or may be a connection to a conventional electrical power supply of a building adjacent the tank 12.

By providing a electrical nonconductive communications portion 22, the electric signals obtained by the water detection circuit 34 and the transducers 38 and 42 are able to be conveyed—optically—outside of the tank 12 without the concern that the wire transmitting the information raises the risk of explosion within the tank. Once the optical signals are outside the tank 12, they may be converted back into electrical signals and treated in the conventional manner.

Figure 2:
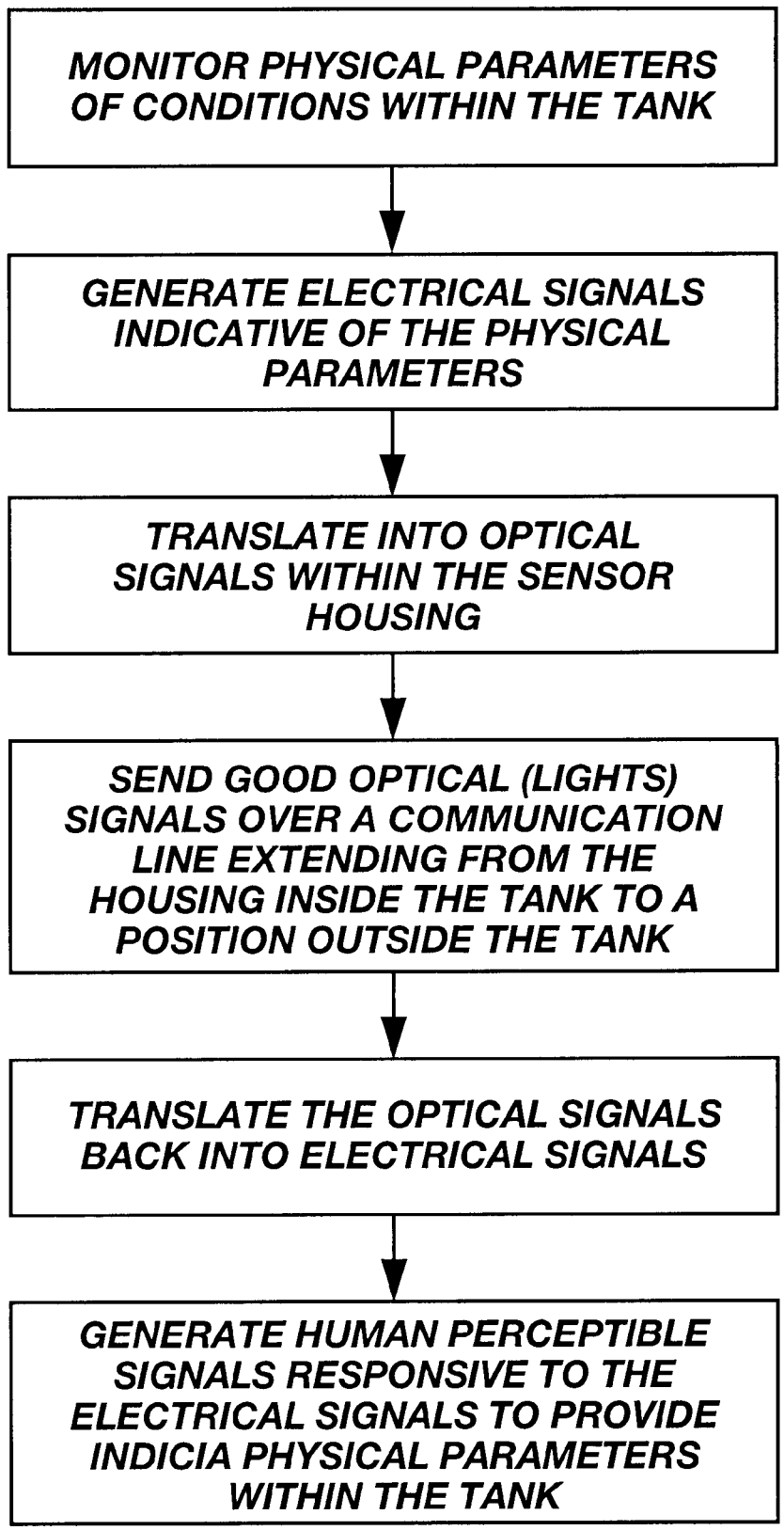
FIG. 2 shows a flow chart of the steps followed when applying the method of the present invention.

Referring now to FIG. 2, there is shown a flow chart of the steps of the present invention. First, a plurality of sensors monitor physical parameters of conditions within the tank and generate electrical signals indicative of the physical parameters. The electrical signals are then translated into optical signals within the sensor housing. The optical sensors are then sent over a communication line which is electrically nonconductive, such as a fiber optic cable.

A means for translating the optical signals is disposed at the end of the communication line for translating the signals back into electrical signals so that they may be processed to provide human perceptible indicia of physical parameters within the tank.

Figure 3:
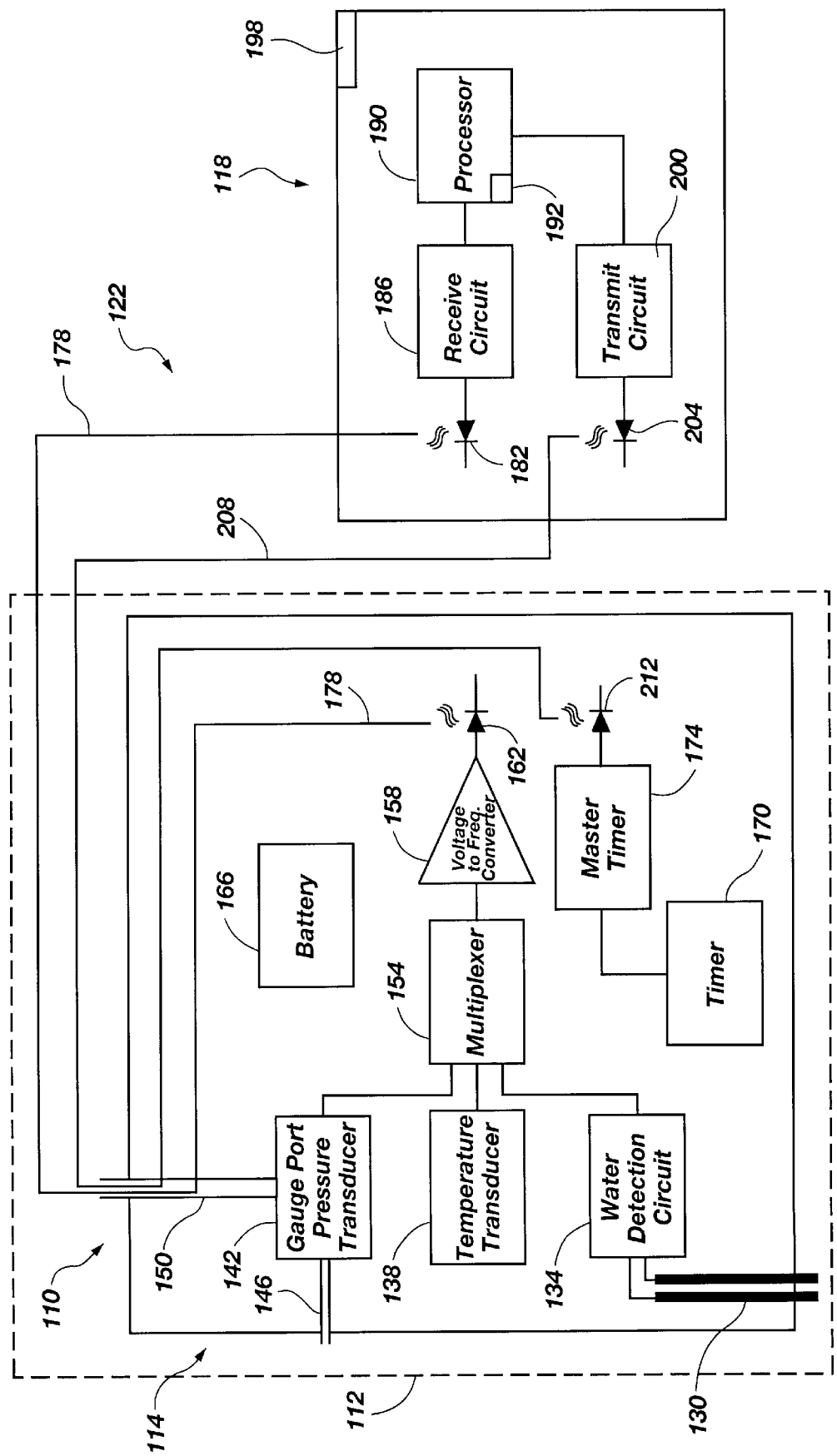
FIG. 3 shows a diagram of another system for monitoring physical parameters within a tank containing flammable liquids in accordance with an alternate aspect of the present invention.

Turning now to FIG. 3, there is shown an alternate embodiment of the present invention, including a monitoring system, generally indicated at 110, a portion of which is disposed within a tank 112. The monitoring system 110 includes a sensor portion, generally indicated at 114, a display portion, generally indicated at 118, and a optical signal conduction/communication portion, generally indicated at 122, disposed between the sensor portion and the display portion.

As in the embodiment shown in FIG. 1, the embodiment shown in FIG. 3 includes a sensor housing 126 which has a pair of water probes 130 which extends from the housing and are disposed in communication with a water detection circuit 134. The probes 130 and the water detection circuit 134 serve the same purposes as identified in the discussion with respect to FIG. 1.

A temperature transducer 138 is also provided and is shown in FIG. 3 as being disposed adjacent to the water detection circuit 134. The temperature transducer 138 is configured to monitor the temperature of liquid surrounding the sensor housing 126.

A gauge port pressure transducer 142 is also provided for measuring the mass of the liquid through a pitot tube 146 which penetrates the housing 126. A reference tube 150 is used to monitor the pressure above the liquid as an accurate basis for differential measurement.

The water detection circuit 134, and the transducers 138 and 142 all send signals indicative of the physical parameters which they have monitored to a multiplexer 154. The multiplexer 154 is sequentially switched so that the signals are sequentially passed to the voltage-to-frequency converted 158. The frequency-based signals are then translated into optical signals by the light emitting diode 162.

As with the embodiment discussed with respect to FIG. 1, power for each of these devices is typically provided by a battery 166 disposed within the housing 126. The battery 166 continually provides power to the timers 170 and the master timer 174. However, as will be explained momentarily, the master time 174 is not the ultimate controller of when the sensors are activated.

As with the previous embodiment, the optical signals generated by the light emitting diode 162 are transmitted out of the housing 126 by the optical transmission line 178, and are converted back into electrical signals by the optical sensor means in the form of a photodiode 182. The electrical signals are amplified and conditioned by a receive circuit 186. The conditioned signals from the receive circuit 186 are then passed to the processor 190 as discussed with respect to FIG. 1. As with the previous embodiment, the processor 190 typically includes a memory 192 for storing the data, and is disposed in communication with a display 198 which is configured to display indicia representing the data in human perceptible form.

The processor 190 is also disposed in communication with a transmit circuit 200. The transmit circuit 200 is disposed in communication with a third translation/conversion means for converting an electrical signal to an optical signal, such as a light emitting diode 204. The optical signals generated by the light emitting diode 204 are conveyed over the optical signal conduction/communication portion 122. While the first electrically nonconductive line 178 could be used, a second electrically nonconductive communication line 208, typically a fiber optic cable, is preferred.

The second electrically nonconductive communication line 208 carries the optical signals back into the tank 112 and into the sensor housing 126. A fourth translation/conversion means, typically an optical sensing means in the form of a photodiode 212, is disposed to receive the optical signals and generate electrical signals responsive thereto. The photodiode 212 is disposed in communication with the master timer 174 in the sensor housing 126.

In such a manner, the user may indicated to the master timer 174 that physical parameters within the tank should be measured. The information is then obtained and relayed to the display. The life of the battery 166 can be significantly extended because the there is no need for periodic monitoring, as the user can simply command the master timer 174 via the processor 190 whenever monitoring is desired. If periodic timing is desired, however, the second nonconductive communications means enables the user to request readings at times other than those previously programmed, and enables the user to change the periods when times at which readings are taken.

Regardless of which embodiment is used, the teachings of the present invention enable the user to make use of conventional sensors and display units without the risk of having a conductive transmission line extending between the sensors and the display unit. In such a manner, the monitoring system is made intrinsically safe within the known meaning, and provides a significant cost savings over the prior art attempts to accomplish the same.

Thus there is disclosed an improved apparatus and method for achieving intrinsic safety with conventional sensors. Those skilled in the art will appreciate numerous modifications which can be made without departing from the scope and spirit of the present invention. The appended claims are intended to cover such modifications.

What is claimed is:

1. A system for monitoring parameters within a tank containing combustible liquid, the system comprising:

sensor means disposed within the tank, said sensor means being operable with respect to the combustible liquid for sensing at least one parameter relating to changing parameters of the combustible liquid within the tank and for generating electrical signals indicative thereof, said sensor means being configured such that all electrical conducting elements associated therewith are isolated from contact with the combustible interior environment of the tank;

first translation means in communication with said sensor means for translating said electrical signals into optical signals, said first translation means being disposed within the tank and configured such that all electrical conducting elements associated therewith are isolated from contact with the combustible interior environment of the tank;

optical signal conduction means having first and second ends and being disposed at the first end adjacent to the first translation means for conveying said optical signals to a processing means outside of the tank; and processor means coupled to the second end of the optical signal conduction means for processing electrical signals to generate indicia for indicating the parameters of the combustible liquid within the tank in response to electrical signals, said processing means including a second translation means for converting light signals conveyed by the light conduction means into electrical signals.

2. The system for monitoring a tank of claim 1, wherein said processor means generates electrical signals indicative of commands, and wherein the processor means further comprises a third translation means for converting electrical signals generated by the processor means into optical signals, the third translation means being disposed in communication with the optical conduction means for conveying the optical signals from the third translation means to the sensor means.

3. The system for monitoring a tank of claim 2, wherein the sensor means further comprises a fourth translation means for receiving optical signals from the optical conduction means and for converting said optical signals into electrical signals.

4. The system for monitoring a tank of claim 3, wherein the optical conduction means comprises a first fiber optic cable extending from the first translation means to the second translation means, and a second fiber optic cable extending from the third translation means to the fourth translation means.

5. The system for monitoring a tank of claim 4, wherein the first and third translation means comprise light emitting diodes.

6. The system for monitoring a tank of claim 5, wherein the second and fourth translation means comprise photodiodes.

7. The system for monitoring a tank of claim 1, wherein the first translation means comprises a light emitting diode.

8. The system for monitoring a tank of claim 7, wherein the first translation means further comprises a voltage-to-frequency converter.

9. The system for monitoring a tank of claim 7, wherein the second translation means comprises a photodiode.

10. A system for monitoring a tank containing combustible liquid, the system comprising:
   a sensor housing disposable within the combustible liquid within the tank and configured to isolate electrical conducting elements contained therein from contact with the combustible interior environment of the tank;
   sensor means disposed within the sensor housing and operable with respect to the combustible liquid for sensing at least one parameter relating to changing parameters of the combustible liquid within the tank and for generating electrical signals indicative of said at least one parameter;
   first translation means disposed within the sensor housing and in communication with said sensor means for translating said electrical signals into optical signals;
   optical signal conduction means for conveying said optical signals to a processing means outside of the tank, the optical signal conduction means having first and second ends, the first end extending into the sensor housing to a position adjacent to the first translation and the second end being disposed outside of the tank;
   second translation means disposed adjacent the second end of the optical signal conduction means for converting optical signals conveyed by the optical signal conduction means into electrical signals; and
   processor means disposed in communication with the second translation means for receiving and processing electrical signals from the second translation means to generate human perceptible signals indicative of the parameters of the combustible liquid within the tank.

11. The system for monitoring a tank of claim 10, wherein the sensor means comprises a water detection circuit, a temperature transducer and a pressure transducer.

12. The system for monitoring a tank of claim 10, wherein the sensor means further comprises a multiplexer disposed in communication with the water detection circuit, the temperature transducer means, and the pressure transducer means.

13. The system for monitoring a tank of claim 10, wherein the first translation means comprises a voltage-to-frequency converter, and a light emitting diode disposed to receive electrical signals from the voltage-to-frequency converter and to convert said electrical signals into optical signals.

14. The system for monitoring a tank of claim 10, wherein the second translation means comprises a photodiode.

15. The system for monitoring a tank of claim 10, further comprising a third translation means for converting electrical signals into optical signals, the third translation means being disposed adjacent to and in communication with the processor means for converting electrical signals generated by the processor means into optical signals.

16. The system for monitoring a tank of claim 15, wherein the third translation means is disposed in communication with the optical signal conduction means, and wherein the system further comprises fourth translation means disposed within the sensor housing for converting optical signals received from the third translation means through the optical signal conduction means, into electrical signals.

17. The system for monitoring a tank of claim 16, further comprising timer means disposed within the sensor housing for controlling the sensor means, and wherein the timer means is disposed in communication with and responsive to electrical signals received from the fourth translation means.

18. A method for monitoring parameters of a combustible liquid within a tank, the method comprising:
   disposing a sensor for measuring at least one parameter of the combustible liquid in the tank, wherein the sensor has a means for generating electric signals indicative of said parameter;
   isolating the electrical conductor elements of said sensor from contact with the combustible interior environment of the tank;
   disposing a processor for receiving electrical signals and for converting electrical signals into a human perceptible signals outside the tank;
   actuating the sensor to produce electrical signals indicative of at least one parameter of the combustible liquid within the tank;
   converting the electric signals generated by the sensor into optical signals within the tank and adjacent the sensor;
   conveying the optical signal out of the tank;
   converting the optical signal back into electronic signals; and
   processing the electrical signals to generate human perceptible signals indicative of the measured parameters of the combustible liquid.

19. The method according to claim 18, wherein the method comprises, more specifically, converting electrical signals into pulses of light within the tank, transmitting the pulses of light to a location outside of the tank and converting the pulses of light back into electrical signals outside of the tank.

20. The method according to claim 18, wherein the method further comprises:
   generating electric command signals outside of the tank, the command signals being configured to control actuation of the sensor;
   converting the electric command signals into optical signals;
   conveying the optical signals into the tank;
   converting the optical signals into electrical signals within the tank at a location adjacent the sensor; and
   directing the electrical signals generated by converting the optical signals to the sensor.

* * * * *